E. R. BURTNETT.
VALVE FOR INTERNAL COMBUSTION ENGINES.
APPLICATION FILED FEB. 25, 1920.
1,394,248. Patented Oct. 18, 1921.
4 SHEETS—SHEET 3.
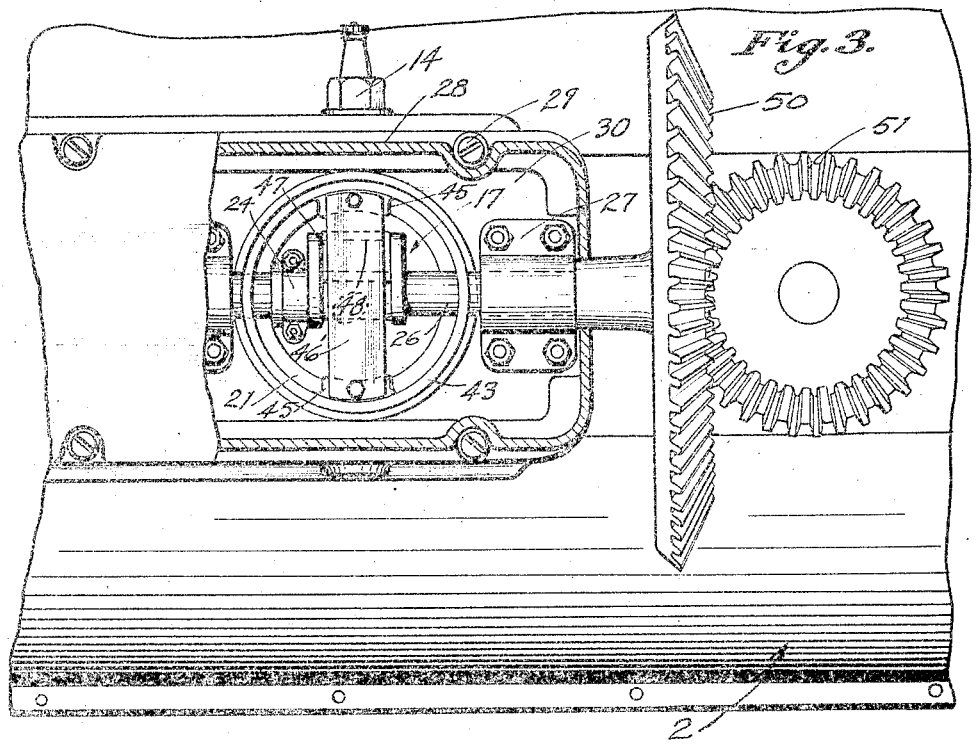
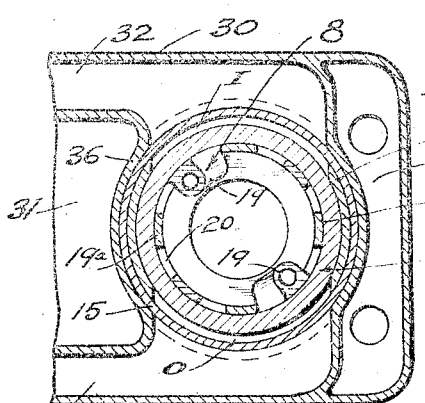
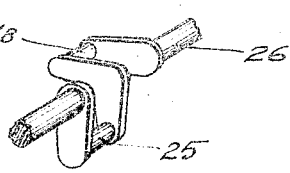
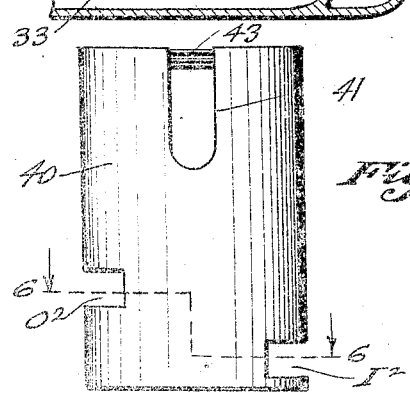
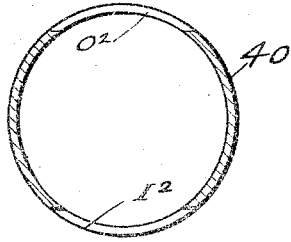
Inventor
EVERETT R. BURTNETT

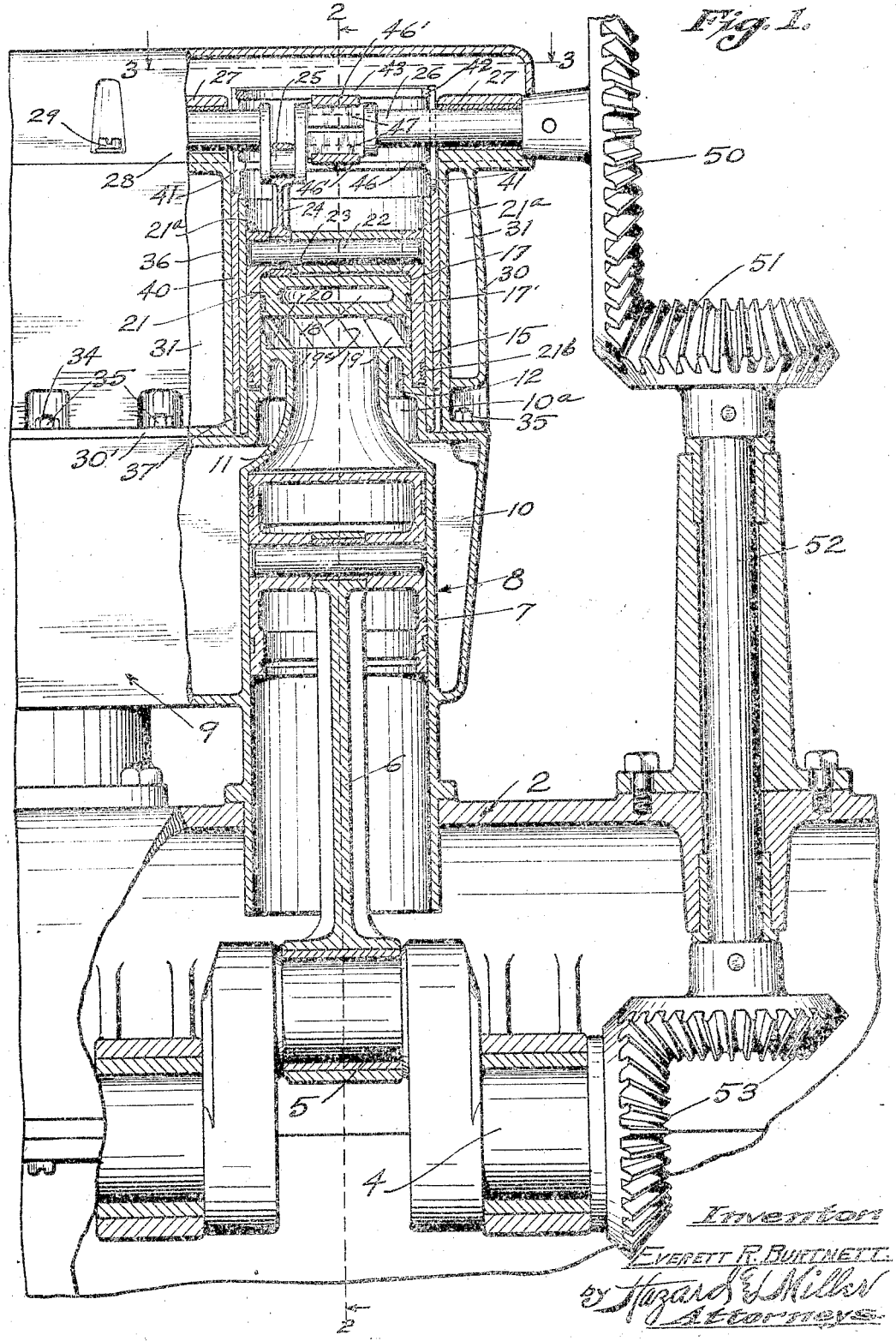

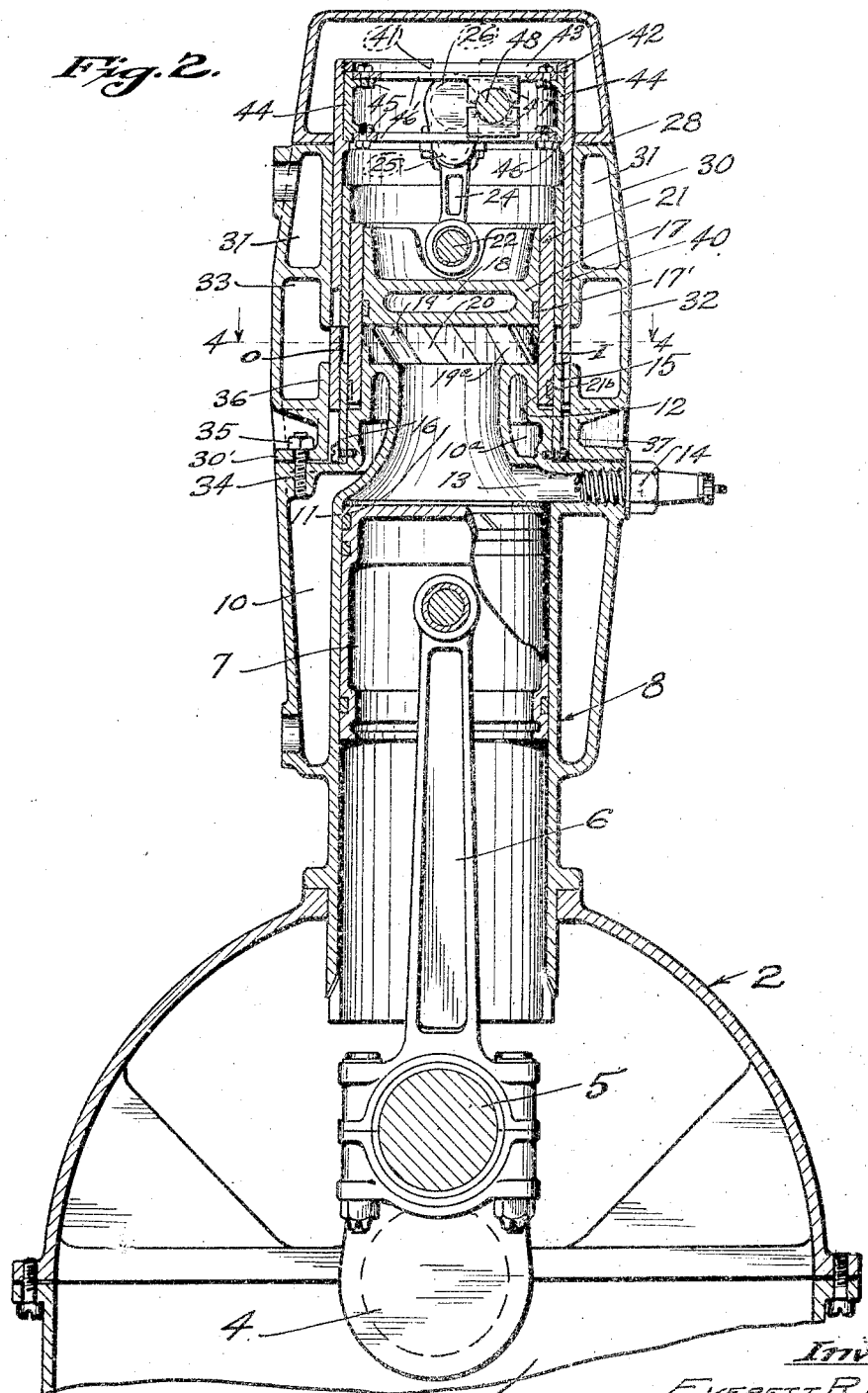

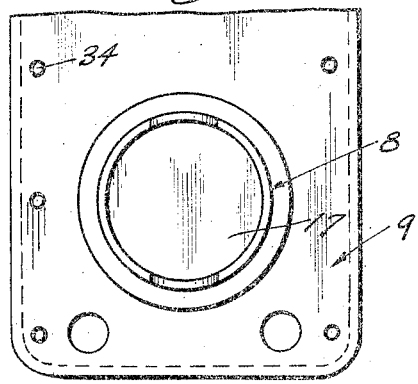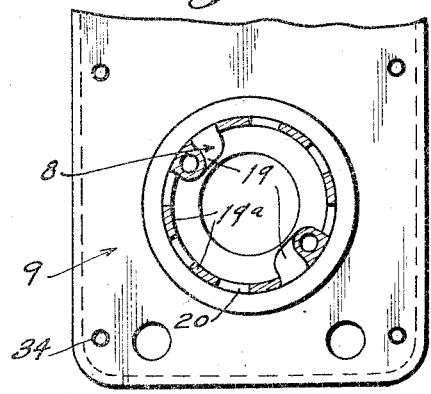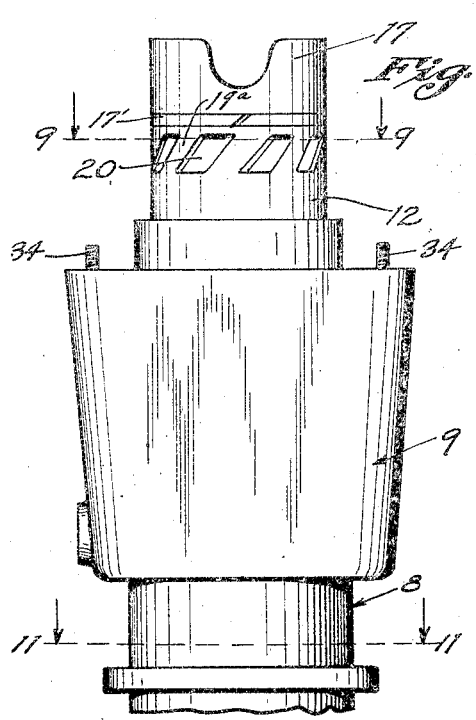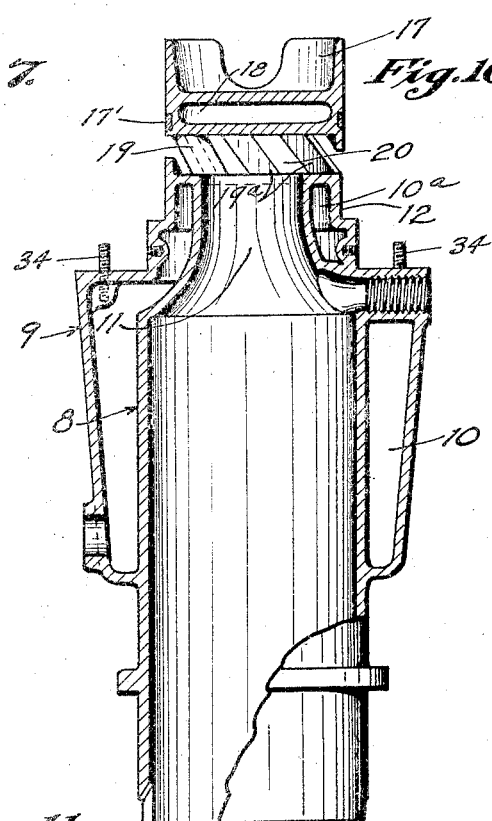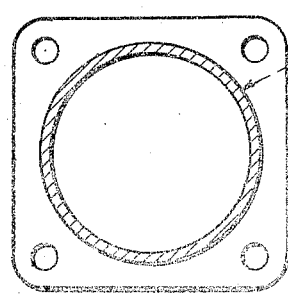

UNITED STATES PATENT OFFICE.

EVERETT R. BURTNETT, OF LOS ANGELES, CALIFORNIA, ASSIGNOR OF ONE-HALF TO HOMER A. BRUNELL, OF LOS ANGELES, CALIFORNIA.

VALVE FOR INTERNAL-COMBUSTION ENGINES.

1,394,248.   Specification of Letters Patent.   Patented Oct. 18, 1921.

Application filed February 25, 1920. Serial No. 361,272.

*To all whom it may concern:*

Be it known that I, EVERETT R. BURTNETT, a citizen of the United States, residing at Los Angeles, in the county of Los Angeles and State of California, have invented new and useful Improvements in Valves for Internal-Combustion Engines, of which the following is a specification.

This invention relates to prime motors and particularly to internal combustion engines, and has for an object to improve the valve mechanism of the same and especially to provide improvements in so-called sleeve valves and valve mechanism for internal combustion engines so as to facilitate lubrication of the parts; also to arrange sleeve valves in concentric but isolated relation and to provide such improvements as will enable the use of comparatively short sleeve valves thereby securing a reduction in weight of the parts and operation with minimum friction. A further object of the invention is to provide for the arrangement of the actuating mechanism of the sleeve valves in such manner as to apply the force to result in the least side or transverse thrust. A further object is to so improve the construction and arrangement of the valve mechanism with respect to the cylinder of the engine that an increase in the convection of the heat of the combustion chamber is secured and also a decrease in clearance necessary for the operation of the piston and valve members respectively, and further to provide for the ready examination and removal and interchange of the several parts pertaining to the valve mechanism without necessitating the dismantling of the engine cylinder or piston parts whatever, and to secure also a valve mechanism that is silent and smooth in operation and to secure also an improvement in the cooling efficiency of the cooling water by so arranging the valves and the piston cylinder that the surfaces of the same may readily radiate their heat to the cooling fluid; and also it is an object to provide an engine of the internal combustion type that is free from pockets and in which the casing sections are of simple and substantial design and proportion and of rugged appearance.

Another object is to provide an engine that is highly efficient and is light and that is substantially fool proof in its construction and organization. The invention consists of the construction, the combination and in details and arrangements of the parts an embodiment of which invention is illustrated in the accompanying drawings and described and claimed herein.

Figure 1 is a side elevational view of a portion of the improved engine, some of the parts being in central, vertical section, the view illustrating but one unit of an engine.

Fig. 2 is a vertical sectional view on line 2—2 of Fig. 1 in a plane at right angles to the crank shaft.

Fig. 3 is a horizontal sectional view on line 3—3 of Fig. 1.

Fig. 4 is a horizontal sectional view on line 4—4 of Fig. 2.

Fig. 5 is a side elevation of the outer sleeve valve showing the ports on opposite sides.

Fig. 6 is a section on line 6—6 of Fig. 5.

Fig. 7 is a detail elevational view of the upper portion of the engine cylinder and the port head at the upper end thereof.

Fig. 8 is a plan view of Fig. 7.

Fig. 9 is a cross section on line 9—9 of Fig. 7.

Fig. 10 is a central, vertical section through a cylinder of a unit.

Fig. 11 is a section on line 11—11 of Fig. 7.

Fig. 12 is a perspective of a portion of the crank shaft of the sleeve members.

The invention is shown as incorporated in an engine in which there is a main crank case section 2, Fig. 1, to the bottom of which is secured an oil pan or section 3 and in which sections operates the crank shaft 4 on one of the cranks 5 of which there is provided a connecting rod 6 attached in suitable manner to a piston 7. The piston is shown as disposed in its individual cylinder 8 that may form one of a series of any number in the cylinder block 9.

The cylinders 8 are each entirely surrounded by a water jacketing chamber 10 and have each an upwardly extending and contracted combustion and compression pocket 11 which also is surrounded by a portion 10ª of the water chamber. It will be seen from this that the piston cylinders 8 are without port apertures as are also the upwardly extending and contracted compression pockets 11, and these are efficiently cooled by the free circulation of the cooling medium.

The upper portion of the compression or explosion chamber 11 is, as shown in Figs. 1 and 2, provided with an annular depending skirt or flange portion 12, and at one side of this flange portion and extending into the combustion chamber 11, Fig. 2, is arranged a sparking chamber 13 in which is arranged a spark plug 14 this latter, preferably, being disposed at a plane adjacent the upper end of the piston cylinder 8 proper.

The outer surface of the skirt or flange portion 12 of a cylinder is finished and is provided with a fixed tubular portion 15 that may be secured as by means of screws 16, this fixed tubular portion forming substantially a part of the casing and extending well above the upper end of the chamber 11 and is provided with diametrically opposite ports I for the inlet and O for the outlet of vapors and gases.

The combustion chamber 11 is provided with an integral head portion 17 which is shown as provided with a water chamber 18 in its transverse part which communicates with the subjacent water chamber 10$^a$ as by means of a series of tubular connections 19, Fig. 4, shown as spaced, preferably, at equal distances around the cylindrical body, and between the same are formed ports 20, preferably, obliquely or helically arranged as to the axis of the cylindrical part 12 for the purpose of preventing scoring or cutting of valve members to be described hereinafter.

Any suitable number of the conducting tubes 19 may be used in the connection of the head portion 17 with the body portion 12, and there may be provided intermediate wall ties as 19$^a$ the parts 19 and 19$^a$ being, as above stated, annularly spaced and thus forming a series of the ports 20 substantially encircling the intermediate portion at the upper portion of the combustion chamber 11 so as to provide ample area for the admission of fuel vapor through the inlet aperture or port I and the escape of gases of exhaust through the outlet O in the sleeve portion 15.

The flange portion 12 about the combustion chamber 11 is provided with a recessed portion forming a space concentrically about the upper portion thereof and between the head portion 17 and the surrounding fixed sleeve or tubular part 15, and there is slidably mounted in this concentric annular space an inner valve forming part 21, preferably, in the form of a sleeve having a good running fit on the cylindrical surface of the parts 12—17 and also having a good running fit on the inner surface of the fixed part 15. The upper end and inner surface of the valve sleeve or part 21 is provided with inwardly projecting bosses or diametrically opposite lugs 21$^a$ through which is extended a wrist pin 22 on which is mounted a spacing sleeve 23 and on which is also mounted a short connecting rod 24 the upper end of which is connected to the crank 25 of a crank shaft 26 which is mounted in suitable bearings 27 formed in a top or head casing section 28 extending longitudinally along the top of the engine and covering the chambers formed above the heads 17 of the engine units.

This cap or cover member 28 is shown as secured by screwing or other means 29 to an intermediate casing section 30 having a water circulating chamber 31 at its upper portion and at its lower portion on one side a manifold or fuel supply chamber 32 and on its opposite side a manifold or exhaust chamber 33. The lower end of the intermediate section of the casing 30 is provided with a base flange 30' applicable to the longitudinally extending side shoulders of the water compartment 10 of the casing section 9 which may be provided with stay bolts 34 to pass through apertures provided in the flanges 30' and on which bolts may be threaded nuts 35 to clamp the section 30 to the body 9.

The section 30 is provided with a series of vertical cylindrical chamber forming walls 36, concentrically forming a space 37 about each fixed wall member or sleeve 15. In this concentric and annular space there is arranged, with good working fit, an outer sleeve valve 40 the upper end of which extends beyond the inner wall 15 and is longitudinally slotted at diametrically opposite points as at 41 for a suitable length to permit the reciprocation of the sleeve 40 and clear the transversely extending crank shaft 26.

The upper end of the sleeve valve 40 is internally threaded at 42 to receive a lock ring or annulus 43 applicable to hold in place a set of diametrically oppositely arranged brackets 44 having inwardly extending lugs 45 the lower ends of the brackets 44 resting on an inner annular shoulder 46 of the sleeve. Secured to the brackets 45 and extending in a diametrical position across and spaced from each other is a pair of slide or guide rails 46' interposed between which is a sliding block or traveler formed of blocks 47 having their contiguous faces concaved to embrace and form journals for a crank portion 48 of the crank shaft 26 so that when the crank shaft is driven the sleeve or valve forming member 40 is reciprocated in an isolated position with respect to the inner valve forming member 21 which is concurrently reciprocated by its connection to the crank 25; the cranks 25 and 48 being set at 90° with respect to each other and the crank 25 leading the crank 48 in operation of the engine.

The lower end of the sleeve valve 40 is provided on one side with an inlet port I$^2$ and the diametrically opposite side is provided with an outlet port O² so that these ports are designed to respectively register with the inlet port I and the outlet port O in the stationary and intervening sleeve 15. Therefore the inner valve 21 runs on its respective stationary bearing portions 12 and 15 and the outer sleeve 40 runs in an isolated position between the outer surface of the sleeve 15 and the wall of its cylinder 36.

On one end of the valve shaft 26 there is secured a driving gear 50 of twice the diameter of a pinion 51 secured on a shaft 52 that is geared as by bevel gears 53 to the crank shaft 4 of the engine although it is to be understood that any suitable form of gearing may be utilized to connect the main crank shaft 4 and the valve shaft 26 so as to produce the proper ratio of movement.

From the above it will be seen that I have provided an engine of the double sleeve-piston type in which the sleeves are isolated from each other to run in separate and relatively stationary bearings that may be efficiently lubricated and also may be efficiently cooled to dispense as by convection of the heat produced in the explosion chambers of the engine, and furthermore the explosion chamber is also efficiently cooled as is the piston cylinder of each unit all with a beneficial improvement in the economical operation of the engine as regards improved cooling; improved lubrication; and improved functioning of the parts by the reduction of friction. Further the present organization enables the ready access to or inspection of all of the valve mechanism without the necessity of removing any of the lower sections of the casing or disconnecting the piston and connecting rod from the main crank shaft.

To secure effective packing of compression and exhaust pressures the head portion 17 is shown as provided with an expansion packing 17' expanding against the inner surface of the cut-off member or sleeve 21 while the latter is shown as provided at its lower end with an expansion packing ring 21ᵇ operating on the inner surface of the fixed wall 15.

The operation of the motor valve is as follows: Assuming the piston to be at top dead center ready to fire, the valve part O² is just above the port O of the fixed wall 15, and the lower end of the cut-off sleeve 21 is in its lowermost position and overlaps the ports I and O by a portion equal to their width. At this time the packing rings 17' and 21ᵇ are sealing the combustion chamber. The piston operates on the four stroke cycle the first stroke of which takes it to the lower dead center at which time the valve port O² uncovers the port O and the lower end of the cut-off sleeve 21 just registers with the bottom edge of the ports O and I with port I² fully down from port I.

As the piston moves up on the exhaust stroke the sleeve 21 moves up and uncovers the chamber parts 20 and exhaust gases pass out of the ports O and O² during which time the sleeve 40 is moving up until, when the piston 7 reaches upper dead center, the port O² is above the port O. The port I² is then in position shown in Fig. 2 and the cut-off sleeve is at the uppermost position and fully uncovers the parts 20 with which ports I and O register. As the piston runs down on the suction stroke the sleeve 21 starts down but the valve 40 moves up so that port I² uncovers inlet port I in the wall 15 and a charge is induced into the chamber 11. When the piston starts up on the compression stroke the valve sleeve 40 starts down while the cut-off sleeve 21 moves to the position shown in Fig. 2 and the charge is ready to be fired.

Various changes may be made without departing from the spirit of the invention as claimed.

What is claimed is:

1. In an internal combustion engine, a piston cylinder with a water jacket immediately surrounding its body and said chamber extending in a compression pocket part having inlet and outlet ports and having a chambered diametrical head; the said ports being arranged substantially helically; and concentric sleeve valves surrounding the head and controlling the inlet and exhaust of fuel and gases into and from the compression pocket.

2. In an internal combustion engine, a piston cylinder with a water jacket immediately surrounding its body and said chamber extending in a compression pocket part having inlet and outlet ports; concentric sleeve valves surrounding the head and controlling the inlet and exhaust of fuel and gases into and from the compression pocket; and an intermediate fixed port member between the concentric valve members.

3. An internal combustion engine comprising a piston cylinder with an extended contracted portion forming a compression pocket and a head therefor and having ports arranged below the head; a sleeve slidably mounted on the head portion and operative to uncover at one of its ends the said ports and to cover the ports when moving in the opposite direction; a fixed cylindrical wall encompassing the said movable sleeve and having diametrically opposite ports for the inlet and outlet of fuel and gases respectively; and an outer sleeve valve running on the fixed cylindrical wall and having opposite inlet and outlet ports longitudinally offset.

4. In an internal combustion engine, a casing section having a combustion head and piston cylinder, the combustion chamber having an exterior cylindrical finished surface concentric to the axis of the piston cylinder and valvular means concentric to the head portion, means arranged above the head portion for actuating the movable valve members, said means including a valve operating shaft extending diametrically across the head of the combustion chamber and having cranks sweeping within the circle of one of the valve members.

5. In an internal combustion engine, a piston cylinder including a compression pocket part having inlet and exhaust ports, the said ports being arranged substantially helically, and valvular sleeve members controlling the inlet and exhaust into and from the compression pocket.

6. An internal combustion engine, comprising a piston cylinder including a compression pocket having ports arranged therein, a sleeve slidable upon the cylinder and operative to open and close said ports, a cylindrical wall encompassing the slidable sleeve and having inlet and exhaust ports, and an outer sleeve slidable upon the cylindrical wall and having inlet and exhaust ports.

7. In an internal combustion engine, a piston cylinder and a combustion chamber, with a water jacket immediately surrounding the body of said cylinder and said chamber, said chamber extending into a compression pocket having inlet and exhaust ports, and having a chambered transverse head and concentric sleeve valves surrounding the head and controlling the inlet and exhaust from the compression pocket.

In testimony whereof I have signed my name to this specification.

EVERETT R. BURTNETT.